L. H. TEEL.
TIRE HOLDER FOR AUTOMOBILES.
APPLICATION FILED OCT. 13, 1919.
1,352,559.
Patented Sept. 14, 1920.
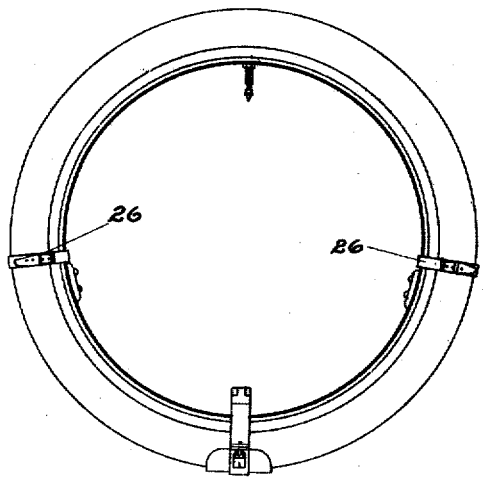
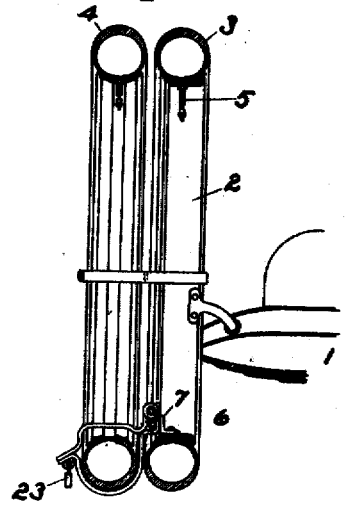
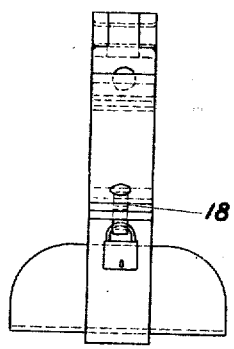
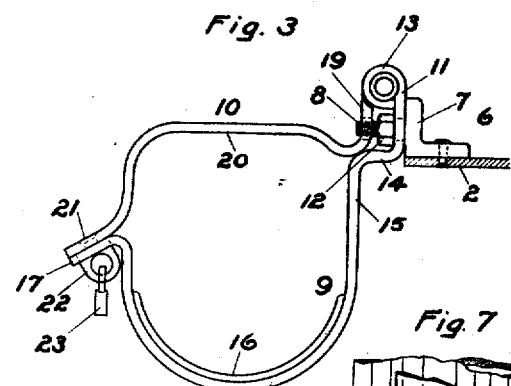
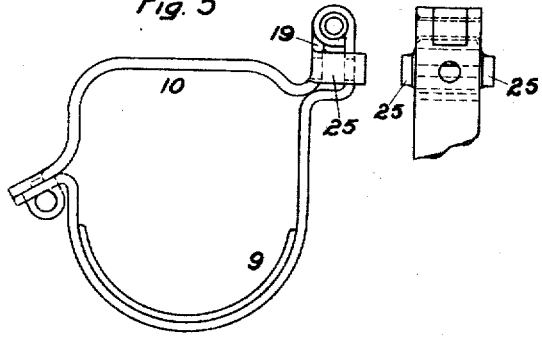
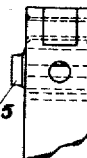
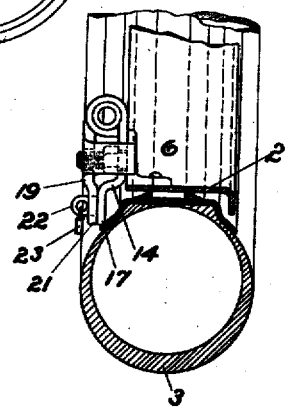
Lawrence H. Teel, Inventor

UNITED STATES PATENT OFFICE.

LAWRENCE H. TEEL, OF SALEM, MASSACHUSETTS.

TIRE-HOLDER FOR AUTOMOBILES.

1,352,559.  Specification of Letters Patent.  Patented Sept. 14, 1920.

Application filed October 13, 1919. Serial No. 330,397.

*To all whom it may concern:*

Be it known that I, LAWRENCE H. TEEL, of Salem, in the county of Essex and State of Massachusetts, a citizen of the United States, have invented a new and useful Improvement in Tire-Holders for Automobiles, of which the following is a full, clear, and exact description, reference being had to the accompanying drawings, forming a part of this specification, in explaining its nature.

The present invention relates to an attachment for automobiles carrying one or two extra tires.

In accordance with the objects of my invention the attachment embodies the element of a locking device where but one extra tire is carried and that of both a support and locking device where two extra tires are carried, the attachment in such instance acting as a support for the second tire and as a locking device for both tires. The device is especially designed to meet those conditions where but one extra tire is usually carried on an automobile but with provision for taking care of a second tire as occasion may demand.

The invention can best be seen and understood by reference to the drawings, in which—

Figure 1 shows in vertical section a set of tires equipped with the attachment embodying the invention, these tires being shown mounted upon the rear end of an automobile of which such portion only is shown as is necessary for a proper understanding of the invention.

Fig. 2 shows in front elevation the outer one of the tires shown in Fig. 1.

Fig. 3 is a side elevation of the attachment.

Fig. 4 is a front elevation thereof.

Fig. 5 is a side elevation of a further embodiment of my invention.

Fig. 6 shows in front elevation a detail of the construction shown in Fig. 5, and Fig. 7 is a view partly in side elevation and partly in section of a form of the attachment embodying my invention adapted for the retention of a single tire.

Referring to the drawings:—

1 represents a portion of the rear end of an automobile to which is fixed the customary tire-carrying rack 2 on which is mounted a tire 3 which will afterward be characterized as the first tire. 4 represents the other or second tire supported from off the rack by the attachment comprising the invention.

It will be observed that the rack supporting the first tire comprises a circular rim or band around which the tire is placed with the stem 5 of the tire extending through the rack, preferably at the top. At the bottom of the rack, or located in a position opposite the location of the stem, when the tire is in place, there is fixed to the rack an L-shaped bracket 6 having a projecting wing or flange 7. This bracket is positively fixed to the rack by welding, riveting or otherwise. The flange 7 is equipped with an outwardly-projecting threaded shank or screw 8 which assists in securing the attachment to the bracket as will presently be explained.

The attachment in its broader elemental aspects comprises a combination of fixed and movable straps 9 and 10, respectively, of which 9 is a fixed strap and 10 a movable one hinged to the fixed strap.

Both straps are bent straps, the various portions of the straps made by the bending performing different functions and the straps will accordingly be described in the light of this consideration. Various embodiments of the straps are shown in the drawings, and reference will first be made to the embodiments thereof shown in Figs. 1 to 4, inclusive.

As there shown the strap 9 comprises a portion 11 which is the portion or part by which the strap is attached to the flange 7 of the bracket. The part 11 fits snugly against the bracket and is provided with an opening through which the threaded shank 8 extends. Arranged upon this shank is a nut 12 which bears against the part 11 of the strap and when tightened securely fixes the strap to the bracket. Just above the nut the outer end of the strap 9 is bent to coöperate with the strap 10 in the formation of a hinged joint 13, the strap 10, in other words, being hinged to the strap 9 at the point of the joint 13 lying just above the nut or fastening 12. Below the nut the strap 9 is provided with a shoulder 14 projecting outwardly just beneath the nut. Thence the strap turns downwardly over the outer face of the tire 3 by a portion 15 acting as a keeper for this tire when the tire is in place. From the part or portion 15 the strap is extended by a curved portion 16 acting as a support for the second tire 4. Beyond the curved portion 16 the strap presents a turned end 17 having a slot 18 in it.

The movable strap 10, which will be described in the light of its downturned or operative position as shown in the drawings, comprises an inner end portion which coöperates with the end of the strap 9 in the formation of a hinged joint 13 as outlined above. From this point the strap extends to provide a portion 19 which passes in front of the nut or fastening 12 and downwardly into approximate contact with the strap 9 at the point of the turn in this strap between its parts 14 and 15. In practice I prefer to provide the portion 19 of the strap 10 with a hole or opening in it into which the end of the threaded member or shank 8 extends. Beyond its portion 19 the strap 10 extends outwardly by a portion 20 and over the tire 4 when in place, acting as a keeper therefor. Beyond its portion 20 the strap 10 presents an out-turned end 21 bearing a staple 22 which passes through the slot 18 in the end of the strap 9 and is secured by a lock 23, the free ends of the two straps being thereby locked together.

In connection with the description of the respective straps as outlined above, it will be observed that the straps so coöperate with one another as to provide a housing within which the nut or fastening 12 is contained. In other words, the part 11 of the strap 9 forms the rear wall of the housing, the joint 13 the top wall thereof, the portion 14 of the strap 9 the bottom wall of the housing, and the portion 19 of the strap 10 the front wall thereof. Moreover, these various parts of the respective straps forming the walls of the housing so closely envelop the nut and are made so wide relatively to the width of the nut that it is practically impossible to obtain access to the nut for releasing it when the parts are in their operative positions. The nut can only be released by the unfastening of the two ends of the straps when the strap 10 may be turned upwardly into an out-of-the-way or disengaging position when access may be had to the nut for turning it.

While the combined strap portions or housing form a very efficient safety device for insuring against turning of the nut until the strap 10 is released, yet I prefer to employ a further safeguard, and in this connection reference is made to Figs. 6 and 7, respectively, of the drawings. As there shown the portion 19 of the strap 10 is provided with flanges 25 which, when the strap 10 is in operative position, extend by the sides of the housing for the nut provided by the other strap portions as aforesaid and thereby prevent access to the nut from the otherwise open sides of the housing. The nut thus becomes practically enveloped and cannot be turned without first releasing the strap 10. A further advantage of the flanges 25 resides in the fact that these flanges are made of sufficient length to extend by and fit snugly against the sides of the portion 11 of the strap 9 when the strap 10 is in its operative or engaging position. Such engagement of the flanges and the sides of the portion 11 of the strap 9 will act to prevent lateral play or vibration of the strap 10 and thereby assist in the effectiveness of the device.

The method of using the attachment is as follows: Assuming that the attachment is disengaged from the rack: the first tire 3 is placed upon the rack. The attachment is then applied to the threaded shank or screw 8 projecting from the bracket. The strap 10 is then turned to a disengaging position and the nut 12 applied to the threaded shank and tightened, thereby securing the attachment to the bracket. The second tire is then placed within the support 16 provided by the strap 9. The strap 10 is then turned down into its operative or engaging position and the meeting ends of the straps locked together. The second tire can then be secured to the first tire by any suitable releasable strap fastenings 26. The removal of the tires is simply a reversal of the operation just outlined.

The effectiveness of the device is not modified even though a second tire is not carried. Thus the attachment is adaptable to a situation where a second tire is only occasionally carried.

In Fig. 7 an embodiment of the attachment is shown which is applicable only for the retention of a single tire as demand may be made therefor. In such case the portions 16 and 20 of the straps 9 and 10 are those which coöperate in the retention of the second tire, are eliminated and the portions 14 and 19 of the straps are provided with the meeting ends 17 and 21, respectively. These ends are fastened together in precisely the same manner as outlined above, excepting, however, that the staple 22, secured by the lock 23, is carried by the end 17 and extends through an opening in the end 21. This modified construction possesses all the advantages of the attachment first described in so far as the retention of a single tire is concerned. That is, the nut fastening the attachment to the bracket is made inaccessible by the housing provided by the straps and the attachment can only be released through a release of the lock and the turning of the strap 10 to its disengaging position.

Having thus fully described my invention, I claim and desire to secure by Letters Patent of the United States:—

1. The combination with a tire-supporting rack and fixture secured to said rack having a threaded shank projecting therefrom, of a tire-retaining member arranged upon said shank and extending by the face of a tire mounted upon the rack, a nut on said shank fixing said member, a member hinged to said first-named member and movable to occupy either an operative position or an out-of-the-way turned position and when occupying its operative position coöperating with said first-named member to form a housing enveloping said nut, said members being provided with ends adjacent one another and lockable together when said hinged member is occupying its operative position.

2. A tire-holding attachment of the character specified comprising a fixture having a threaded shank, a tire-retaining releasable member loosely mounted upon said shank, a nut on said shank fixing said member, a member hinged to said first-named member and movable to occupy an operative position or an out-of-the-way turned position and when occupying its operative position coöperating with said first-named member to form a housing enveloping said nut, said members being provided with ends occupying positions adjacent one another when said hinged member is occupying its operative position, and means for locking together the adjacent ends of said members.

3. A tire-holding attachment of the character specified comprising a fixture having a threaded shank, a tire-retaining removable member mounted upon said shank, a nut on said shank fixing said member, a releasable lockable member connected to said first-named member and extending in front of said nut preventing access thereto for turning the nut when said releasable member is occupying its locked position, and a flange-forming means carried by said releasable member and laterally enveloping said nut to prevent lateral access thereto when said releasable member is occupying its locked position as aforesaid.

4. A tire-holding attachment of the character specified having in combination means for holding a tire in place and comprising a tire-retaining member, a shank and a releasable nut on the shank holding said member, said tire-retaining member being extended to form a support for holding a second tire, and other releasable means lockable to said first-named means and otherwise coöperating therewith to envelop said nut and prevent access thereto and extend over said second tire for assisting in the retention thereof when said last-named means is occupying its engaging position.

5. A tire-holding attachment of the character specified having in combination means for holding a tire in place comprising a tire-retaining member, a shank and a releasable nut on the shank fixing said member, said tire-retaining member being extended to form a support for a second tire, and a member hinged to said first-named member movable to occupy either an operative or an out-of-the-way position and when occupying its operative position extending over said nut to prevent access thereto and over said second tire to assist in the retention thereof, said members being provided with adjacent ends lockable together.

LAWRENCE H. TEEL.